United States Patent
Muth

(10) Patent No.: US 6,686,733 B2
(45) Date of Patent: Feb. 3, 2004

(54) METHOD FOR OFFSET COMPENSATION OF A MAGNETORESISTIVE POSITION OR ANGULAR POSITION MEASURING SYSTEM

(75) Inventor: Michael Muth, Stelle (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/262,382

(22) Filed: Oct. 1, 2002

(65) Prior Publication Data

US 2003/0076090 A1 Apr. 24, 2003

(30) Foreign Application Priority Data

Oct. 4, 2001 (DE) .......................... 101 48 918

(51) Int. Cl.$^7$ .......................... G01R 35/00; G01B 7/00
(52) U.S. Cl. .................. 324/202; 324/207.12; 702/85
(58) Field of Search ................ 324/207.12, 207.21, 324/207.24, 202, 235, 252, 207.25; 702/85–107; 338/30 R

(56) References Cited

U.S. PATENT DOCUMENTS 5,327,078 A * 7/1994 Mori ...................... 324/207.24
5,497,084 A * 3/1996 Bicking ................. 324/207.25
6,501,261 B2 * 12/2002 Muth ......................... 324/166
6,534,969 B1 * 3/2003 Dietmayer ............. 324/207.12

* cited by examiner

Primary Examiner—N. Le
Assistant Examiner—Reena Aurora
(74) Attorney, Agent, or Firm—Aaron Waxler

(57) ABSTRACT

A method for offset compensation of a magnetoresistive position or angular position measuring system includes at least one Wheatstone bridge with four locally offset magnetoresistive resistors to which a DC voltage is applied and past which a permanent magnet is moved, wherein the respective bridge voltage is measured, by which method a subsequent offset compensation of magnetoresistive position or angular position measuring systems is also possible on site. Provision is made for a calibration cycle to be run through upon start-up of the measuring system, by moving the permanent magnet past the bridge(s) for a measuring cycle, evaluating the extreme values of the bridge voltages measured during this procedure by deriving the mean values thereof, and deriving from these mean values corresponding compensation values in the form of offset values to be taken into consideration by the measuring system, the compensation values being stored in a register.

6 Claims, 1 Drawing Sheet

METHOD FOR OFFSET COMPENSATION OF A MAGNETORESISTIVE POSITION OR ANGULAR POSITION MEASURING SYSTEM

BACKGROUND OF THE INVENTION

The invention relates to a method for offset compensation of a magnetoresistive position or angular position measuring system, which comprises at least one Wheatstone bridge with four locally offset magnetoresistive resistors to which a DC voltage is applied and past which a permanent magnet is moved, wherein the respective bridge voltage is measured.

It is currently common to use magnetoresistive sensors for position and angular position measurement. These consist of magnetoresistive resistors which are arranged in the manner of a Wheatstone bridge on a generally disk-shaped support in front of which a permanent magnet rotates. To obtain a linear output signal, two bridges are used whose resistors are arranged at a mechanical angle to one another of 45°, such that one bridge generates a sinusoidal signal and the other a cosinusoidal signal. The ARCTAN function then allows a linear function over 180° as the output signal. The signals are evaluated, for example, in a mixed-signal IC which together with the sensor constitutes a measuring system.

Due to the production process, the magnetoresistive resistors are non-identical, which, however, may be compensated in the IC when the measuring system is started up. This compensation thus takes place individually for each individual measuring system. During a final measuring process, the sensor is magnetically excited in such a way prior to delivery that the individual offset, i.e. the respective offsets of the two bridges, may be determined from the signals. These values are written into an EEPROM in the IC and subsequently taken into account by the IC.

EP 1 001 248 A2 describes a method for one-off calibration on the production line of a measuring system with magnetoresistive sensors, by exposing the bridges to external magnetic fields of different directions. The output voltage supplied by a Wheatstone bridge after removal of a direct magnetic field is thus a measure for the respective offset voltage, which is used for calibration.

In addition to the tolerances caused by the production process, the magnetic resistors are also subject to aging, which causes further offset errors. If it is to be dependable with regard to new offset errors, therefore, the system would have to be recalibrated from time to time under factory-like conditions, which entails a level of expenditure which the user is naturally reluctant to contemplate. Instead, they would rather put up with an error.

SUMMARY OF THE INVENTION

It is therefore an object of the invention to provide a method by which a subsequent offset compensation of magnetoresistive position or angular position measuring systems is also possible on site.

According thereto, when a measuring system is started up, a calibration cycle is performed by
   moving the permanent magnet past the bridge(s) for a measuring cycle,
   evaluating the extreme values of the bridge voltages measured during this procedure by deriving the mean values thereof, and
   deriving from these mean values corresponding compensation values in the form of offset values to be taken into consideration by the measuring system, said compensation values being stored in a register.

Such a calibration cycle may be performed whenever the measuring system is switched on. However, provision may alternatively be made for a calibration cycle to be performed only after an appropriate number of measuring cycles, for example every tenth cycle. For certain applications, for example for motor vehicles, provision may also be made for only authorized personnel to be permitted to perform calibration, such that it could then be performed during scheduled maintenance.

In the latter case, the EEPROM into which the compensation values were written during factory calibration could be used as the register. In the event of a basic calibration cycle being performed each time the measuring system is started up, a volatile memory may alternatively suffice as the register.

The invention has the advantage that offset calibration may be performed automatically or as desired throughout the entire service life of the measuring system. The calibration cycle may be incorporated into the start-up procedure of a machine, such that it runs automatically after the machine is switched on, by performing a calibration of an angular position measuring system in a no-load state, for example. For this, a half revolution of the permanent magnet is sufficient. A measuring time of less than 100 ms is sufficient for the calibration cycle.

Provided that a high field is used in the measuring system, i.e. that the sensors reach saturation with regard to amplitude and thus only the phase angle but not the sensitivity of the measuring signal is of relevance, it is ensured that the measured quantity is run through fully in the event of a half-revolution of the permanent magnet and thus the measured extreme values are guaranteed "true" values. This means that the determined offset values are always "true".

BRIEF DESCRIPTION OF THE DRAWING

The invention will be further described with reference to an embodiment. In the appended drawings.

DESCRIPTION OF THE PREFERRED EMBODIMENTS

Figure 1:
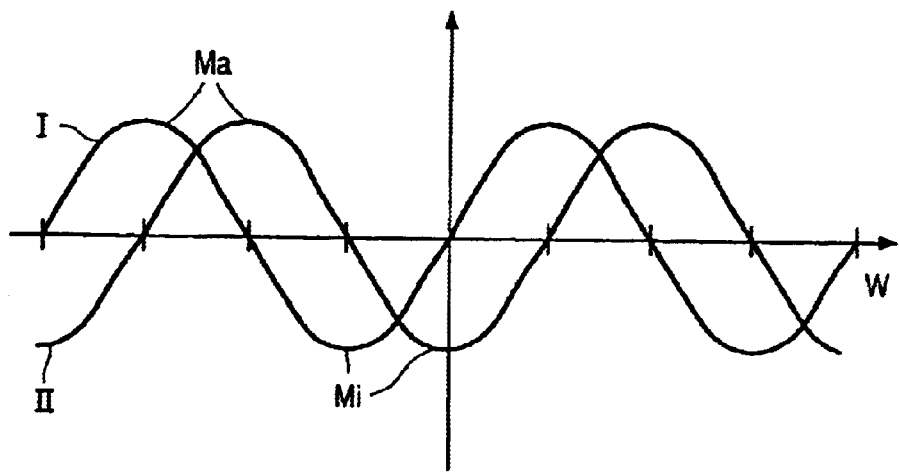
FIG. 1 shows the gradient of the sensor output signals for clarification of the method.

FIG. 1 shows the gradient of the voltage signals from two Wheatstone bridges arranged at 45° to one another as a function of the angle of a permanent magnet rotating past the magnetoresistive resistors of the bridges. This angular alignment corresponds to an electrical angle of 90°. The reference system shows a sinusoidal profile I of a sensor A and a negatively cosinusoidal signal profile II of a sensor B. An offset would reveal itself in a constant displacement of the voltage signal obtained along the angle (W).

An offset may therefore be determined by measurement of the maxima (Ma) and minima (Mi). In a calibration cycle, the four extreme values are determined, in that the measuring cycle is performed once by rotating the permanent magnet, and at the same time four extreme-value registers are activated, i.e. each sensor A and B has two registers, in one of which the minimum is determined and in the other the maximum. This may occur in the manner of a comparison, for example, in that a time-discrete signal is stored and compared with the next sampled value. The following applies for the maximum register: if the next value is higher than the last, accept the value, otherwise not. The reverse is true of the minimum register. At the end of this measuring process, an acknowledgement may optionally be provided by the user. The sensor IC then calculates the mean value (offset) and stores a suitable compensation value in a register, which from then on is used for offset compensation.

Figure 2:
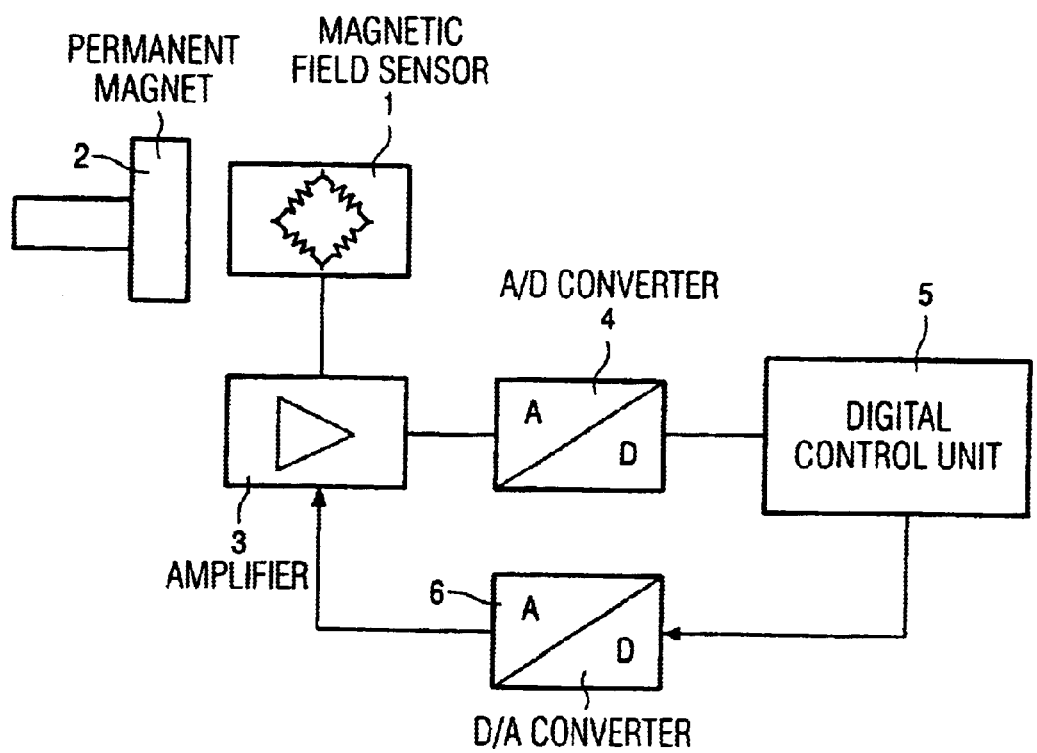
FIG. 2 is a block diagram of the measuring system.

FIG. 2 is a block diagram of the angular position measuring system for a sensor. A permanent magnet 2 is positioned rotatably in front of a magnetic field sensor 1, which comprises magnetoresistive resistors arranged in bridge circuits. The magnetic field sensor 1 presents the angular position of the permanent magnet 2 as an electrical variable, as was shown in FIG. 1. The sensor signal passes via an amplifier 3 and an A/D converter 4 to a digitally operating control unit ("digital control") 5. During the calibration cycle, the maxima and minima of the sensor signals are sought, the offset voltage is determined, and a compensation value is established, as described above.

During subsequent operation of the angular position measuring system, the digitized signal is processed directly in the control unit 5, and the compensation value stored in the control unit 5 is returned via a D/A converter 6 to the amplifier 3, in order to counteract the previously established offset, such that the input signal at the A/D converter 4 is offset-free.

List of Reference Numerals

1 Magnetic field sensor
2 Permanent magnet
3 Amplifier
4 A/D Converter
5 Control unit
6 D/A Converter
Ma Maxima
Mi Minima
W Angle
I, II Signal profiles

What is claimed is:

1. A method for offset compensation of a magnetoresistive position or angular position measuring system, which comprises at least one bridge circuit with four locally offset magnetoresistive resistors to which a DC voltage is applied and past which a permanent magnet is moved, wherein the respective bridge voltage is measured, characterized in that, when the measuring system is started up, a calibration cycle is performed, by moving the permanent magnet past the bridge(s) for a measuring cycle, evaluating the extreme values of the bridge voltages measured during this procedure by deriving the mean values thereof and deriving from these mean values corresponding compensation values in the form of offset values to be taken into consideration by the measuring system, said compensation values being stored in a register.

2. A method as claimed in claim 1, characterized in that the calibration cycle is run through at each start-up.

3. A method as claimed in claim 1, characterized in that the calibration cycle is run through at every nth start-up, wherein n is a natural number that may be chosen as desired.

4. A method as claimed in claim 1, characterized in that the calibration cycle is performed upon a start-up that may be chosen as desired.

5. A method as claimed in claim 1 characterized in that the calibration cycle is incorporated into the start-up procedure of a machine such that it is run through automatically.

6. A method as claimed in claim 1 characterized in that the position or angular position measuring system is operated with a high field.

* * * * *